March 9, 1937. A. L. CORNWELL 2,073,399
BRAKE LINING TIGHTENER
Filed June 6, 1936
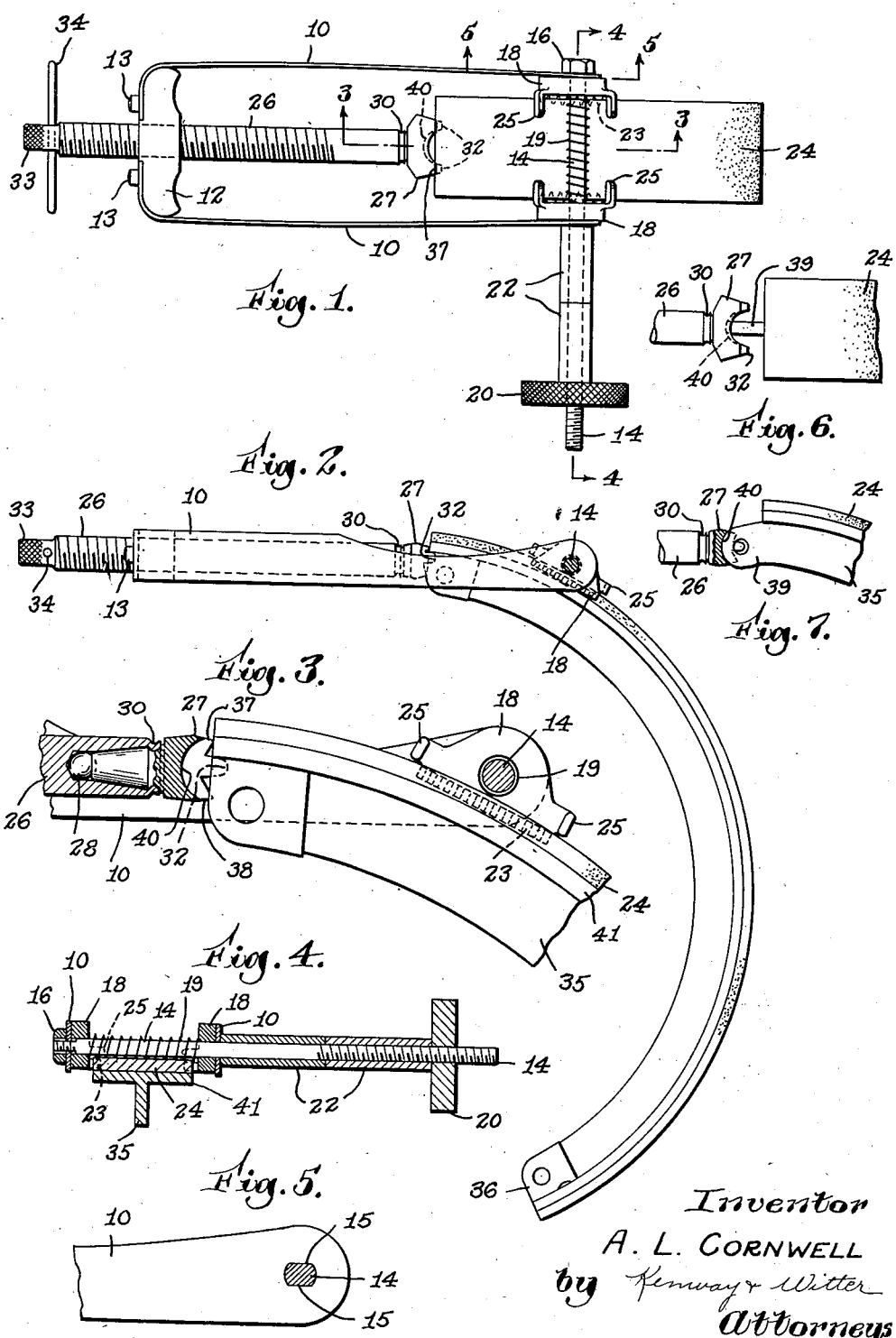
Inventor
A. L. CORNWELL
by Kenway & Witter
Attorneys Patented Mar. 9, 1937

2,073,399

UNITED STATES PATENT OFFICE 2,073,399

BRAKE LINING TIGHTENER

Arthur L. Cornwell, Wellsville, N. Y.

Application June 6, 1936, Serial No. 83,909

12 Claims. (Cl. 29—84)

This invention relates to devices for tightening brake lining when applying such lining to the brake bands of automobiles. Unless such lining is secured tightly and uniformly on the brake shoes, squeaks, chatters, spongy ineffective brakes and the necessity for frequent adjustments will result. Various tools, commonly called stretchers or clamps, have been used for holding the brake lining tight against the brake shoes while drilling and riveting the same in place thereon. Among the various objections to such tools, it may be mentioned that they are slow in operation and they grip against one or both flat surfaces of the lining. This latter feature is particularly objectionable since the lining end gripped cannot be secured to the shoe while the lining is in tightly stretched condition on the shoe and the gripping of the outer and braking surface of the lining tends to injure such surface. The primary object of my invention is the production of an improved tool for this purpose which grips the brake lining at its edges and thereby eliminates the objections present in these former tools.

The improved tool comprising my invention embodies a pair of opposed jaws having teeth for engaging the opposite edges of a brake lining mounted on a brake shoe and cooperating power means for engaging one end of the shoe and tightening the lining firmly against the shoe throughout its entire length, the tool leaving the lining unobstructed at said end of the shoe whereby it may be riveted to the shoe. In its preferred form the tool is of U-shaped construction and embodies a pair of resilient arms carried on a block and having their free ends normally springing apart and carrying the work gripping jaws. Novel means are provided for properly locating the jaw teeth relative to the lining edges to be engaged and a power screw threaded into the block is provided with an outer end adapting the screw to be quickly rotated into place and then turned under load to provide the necessary power. The production of an improved tool embodying these features comprises a further object of the invention.

These and other features of the invention will be best understood and appreciated from the following description of a preferred embodiment thereof, selected for purposes of illustration and shown in the accompanying drawing in which, Fig. 1 is a plan view of my improved tool in use, Fig. 2 is a side elevation thereof, Fig. 3 is a fragmentary sectional view taken on the line 3—3 of Fig. 1, Fig. 4 is an enlarged fragmentary section through the tool along the line 4—4 of Fig. 1, Fig. 5 is a cross sectional view taken on the line 5—5 of Fig. 1, Figs. 6 and 7 are fragmentary plan and side views showing a modified use of the tool.

Referring now to the embodiment of the invention which I have illustrated in the drawing, 10 indicates a pair of arms carried on a block 12 and projecting outwardly therefrom in opposed relation. The arms are preferably of resilient construction and are preferably riveted rigidly to the block at 13 in a manner causing the arms normally to spread apart. A bolt 14 projects through the free ends of the arms and is prevented from rotation by flat faces 15 fitting a corresponding hole in one of the arms. This flattened end of the bolt is secured to its arm by a nut 16. A pair of jaws 18 are freely mounted on the bolt directly adjacent to and between the arms, an expansion spring 19 on the bolt normally holding the jaws in contact with the arms. The arms are held in the substantially parallel position illustrated in Fig. 1 by a hand wheel 20 threaded to the bolt 14, one or more tubular spacers 22 being provided on the bolt between the hand wheel and the adjacent arm.

The jaws 18 have series of opposed teeth 23 projecting inwardly beyond the jaws for engaging opposite edges of a brake lining 24 to be tightened. These teeth 23 are in substantially straight alignment along each jaw and the jaws can be rotated on the bolt 14 to bring the aligned teeth into proper position to engage the edges of the lining, it being apparent that in the working position of the tool the teeth extend longitudinally of the arms 10 and relatively angular to the line of pull exerted by the power means. Means, herein illustrated as lugs 25 on the jaws and projecting inwardly of the jaws and beyond and laterally of said teeth, are adapted to engage the top surface of the lining to position the teeth relative to the lining. These lugs serve two positioning functions, viz., (1) they position the jaws rotatably into alignment with the lining, and (2) they position the jaws transversely of the lining whereby the teeth engage the lining edges without engaging the brake shoe (Fig. 3).

A power screw 26 is threaded through the block 12 and carries a brake shoe engaging member 27 on its forward end. This member is supported on a shank which rests against a ball 28 within a socket in the end of the power screw and the power screw is rolled inwardly at 30 to secure the ball and shank members in the socket. Such arrangement provides a ball bearing permitting free rotation of the screw relative to the member. The front end of the member is so constructed that it is adapted to engage in fixed abutting position against one end of the brake shoe. Such construction includes one or more forwardly projecting lugs 32 and shoulders 37 and 38, the shoulders being spaced unequal distances from the lugs. The front face of the member is also concavely chambered at 40 between the two lugs for a purpose hereinafter described. The rear end of the screw is knurled at 33 whereby the screw may be rapidly spun into approximate working position and is furthermore provided with a cross bar or handle 34 for turning the screw under load.

In using the tool one end of the brake lining 24 is first riveted to the heel 36 of the brake shoe 35. The operator then grasps the arms 10 adjacent to the jaws 18 in his right hand, spins the screw by its knurled end 33 to the approximate working position, places the member 27 against the end of the shoe (Fig. 2) and squeezes the arms 10 to engage the jaws with the edges of the lining. While thus holding the tool and work, the left hand is used to press the jaws down onto the lining as far as permitted by the lugs 25. The elements are then all held in such position by the left hand while the right hand rotates the hand wheel 20 to set the teeth firmly into the lining. The power screw is then operated to draw the lining tightly onto the shoe and the lining is riveted to the shoe while in such position, it being apparent that the free end of the lining is left unobstructed for such operation and that the direction of pull by the power screw is such (Fig. 2) as to hold the lining in firm contact with the shoe along its entire length.

Particular attention is called to the normal open position of the parts and the convenience of the tool whereby one hand grasping the arms 10 can bring the jaws into engagement with the lining, the other hand being free to manipulate the threaded elements. While the jaws are not carried directly by the arms they are kept in contact with the arms by means of the spring 19. It is also noted that the jaws are not only freely rotatable on the bolt 14, but are also sufficiently loose on the bolt to permit limited lateral adjustment thereof in the plane of the aligned teeth 23 and of the brake lining engaged whereby automatically to adapt themselves to such engagement in linings of different widths. Furthermore, while the tool may be made with fixed jaws and teeth arranged relatively angular to the line of pull exerted by the power screw, in the relative positions illustrated in Figs. 2 and 4, my preferred form of the invention employs rotatable jaws provided with the lugs 25 which automatically position the jaws rotatably and laterally.

In some brake shoes the rib 39 extends beyond the end of the brake shoe rim 41 as in Figs 6 and 7, whereas in others the end of the rib corresponds with the end of the rim as in Figs. 1 to 3. Furthermore, the thickness of the rims varies somewhat in different shoes. The shoe engaging end of the member 27 is so constructed as to adapt it to conform to all such shoes. It is desirable that the member 27 shall not extend above the top surface of the shoe rim 41 and, in applying the tool to a shoe of the nature illustrated in Figs. 1 to 3, the operator places in contact with the rim the shoulder 37 or 38 which better engages the rim without projecting upwardly beyond the rim, the lugs 32 engaging beneath the rim and the recess between each shoulder and lug providing a socket partially receiving the end of the rim as illustrated in Fig. 3. In using the tool on a shoe of the type shown in Figs. 6 and 7, the concave chamber 40 provides a socket for receiving the convex end of the rib as illustrated in such figures. As illustrated in Figs. 2 and 3, it will be noted that the teeth 23 on the jaws are in alignment relatively angular to the line of pull exerted by the power screw 26, whereby to draw the brake lining not only longitudinally but also to draw the free end of the lining down firmly onto the shoe. While I have in the accompanying drawing illustrated a preferred form of my invention, it will be understood that the details thereof may be modified within the scope of the accompanying claims without departing from the spirit of the invention.

Having thus described my invention, what I claim as new and desire to secure by Letters Patent of the United States is,—

1. A brake lining tightener comprising a pair of jaws, means supporting the jaws for relative movement toward and from each other and extending to a point remote from the jaws, the jaws having two series of opposed teeth extending longitudinally of said means and projecting inwardly beyond the jaws for engaging opposite edges of a brake lining mounted on a brake shoe, means for causing relative movement of the jaws toward each other to bring said teeth into gripping engagement with said opposite edges of the brake lining, means having its front face constructed to locate and hold it in fixed abutting position against one end of the shoe, and power means cooperating with the first and last named means for drawing the brake lining longitudinally toward said end of the shoe.

2. A brake lining tightener comprising a pair of jaws, means supporting the jaws for relative movement toward and from each other and extending to a point remote from the jaws, the jaws having two series of opposed teeth extending longitudinally of said means for engaging opposite edges of a brake lining mounted on a brake shoe, means for causing relative movement of the jaws toward each other to bring said teeth into gripping engagement with said opposed edges of the brake lining, means carried by each jaw and projecting inwardly therefrom beyond and laterally of said teeth for engaging the top surface of the lining to position the teeth relative to the lining, means having its front face constructed to locate and hold it in fixed abutting position against one end of the shoe, and power means cooperating with the first and last named means for drawing the brake lining longitudinally toward said end of the shoe.

3. A brake lining tightener comprising a pair of jaws, means supporting the jaws for relative movement toward and from each other and extending to a point remote from the jaws, the jaws having two series of opposed teeth extending longitudinally of said means for engaging opposite edges of a brake lining mounted on a brake shoe, means for causing relative movement of the jaws toward each other to bring said teeth into gripping engagement with said opposed edges of the brake lining, means having its front face constructed to locate and hold it in fixed and abutting position against one end of the shoe, and power means cooperating with the first and last named means for drawing the brake lining longitudinally toward said end of the shoe, the said series of teeth on each jaw being relatively angular to the line of pull exerted by the power means.

4. A brake lining tightener comprising a pair of jaws having opposed teeth for engaging opposite edges of a brake lining mounted on a brake shoe, means supporting the jaws for rotary adjustment and relative movement toward each other to bring said teeth into gripping engagement with said opposed edges of the brake lining, means having its front face constructed to locate and hold it in fixed and abutting position against one end of the shoe, and power means cooperating with the first and last named means for drawing the brake lining longitudinally toward said end of the shoe, the said teeth on each jaw being in alignment along the jaw.

5. The brake lining tightener defined in claim 4 plus lugs carried by each jaw at opposite sides of its axis of rotary adjustment and projecting inwardly of the jaw and beyond and laterally of said teeth for engaging the top surface of the lining to position the teeth relative to the lining.

6. A brake lining tightener comprising a pair of relatively spaced arms, a pair of jaws carried by the arms and having series of opposed teeth extending longitudinally of and projecting inwardly beyond the arms for engaging opposite edges of a brake lining mounted on a brake shoe, means for causing relative movement of the jaws toward each other to bring said teeth into gripping engagement with said opposite edges of the brake lining, means having its front face constructed to locate and hold it in fixed abutting position against one end of the shoe, and power means cooperating with the arms and the last named means for drawing the brake lining longitudinally toward said end of the shoe.

7. The brake lining tightener defined in claim 6 wherein said teeth on each jaw are in alignment along the jaw and wherein the jaws are mounted to have a floating angular adjustment in the plane of such alignment and of the brake lining engaged whereby automatically to adapt themselves to such engagement in linings of different widths.

8. A brake lining tightener comprising a pair of relatively spaced arms, a bolt carried by the arms, a pair of jaws slidable on the bolt between the arms and having opposed teeth projecting inwardly beyond the arms for engaging opposite edges of a brake lining mounted on a brake shoe, means in threaded engagement with the bolt for moving the jaws toward each other to bring said teeth into gripping engagement with said opposite edges of the brake lining, means having its front face constructed to locate and hold it in fixed abutting position against one end of the shoe, and power means cooperating with the arms and the last named means for drawing the brake lining longitudinally toward said end of the shoe.

9. A brake lining tightener comprising a block having a pair of relatively spaced and resilient arms projecting therefrom, the arms normally springing apart, a pair of jaws carried by the arms adjacent to their free ends and having series of opposed teeth extending longitudinally of and projecting inwardly beyond the arms for engaging the opposite edges of a brake lining mounted on a brake shoe, means for moving the arms and jaws toward each other to bring said teeth into gripping engagement with said opposite edges of the brake lining, means having its front face constructed to locate and hold it in fixed abutting relation against one end of the shoe, and power means cooperating with the block and the last named means for drawing the brake lining longitudinally toward said end of the shoe.

10. A brake lining tightener comprising a block having a pair of relatively spaced and resilient arms projecting therefrom, the arms normally springing apart, a bolt carried by the arms adjacent to their free ends, a pair of jaws slidable on the bolt between the arms and having series of opposed teeth longitudinally of and projecting inwardly beyond the arms for engaging opposite edges of a brake lining mounted on a brake shoe, a spring on the bolt between and normally separating the jaws, means in threaded engagement with the bolt for moving the arms and jaws toward each other to bring said teeth into gripping engagement with said opposite edges of the brake lining, means having its front face constructed to locate and hold it in fixed abutting relation against one end of the shoe, and power means cooperating with the block and the last named means for drawing the brake lining longitudinally toward said end of the shoe.

11. A brake lining tightener comprising a block having a pair of relatively spaced arms projecting therefrom, a pair of jaws carried by the arms adjacent to their free ends and having series of opposed teeth extending longitudinally of and projecting inwardly beyond the arms for engaging the opposite edges of a brake lining mounted on a brake shoe, means for moving the arms and jaws toward each other to bring said teeth into gripping engagement with said opposite edges of the brake lining, a power screw threaded through the block, means on the forward end of the screw having its front face constructed to locate and hold it in fixed abutting position against one end of the shoe, the rear end of the screw being knurled whereby to spin the same, and a turning handle carried by the rear end of the screw.

12. A brake lining tightener comprising a pair of relatively spaced arms, toothed means carried by and adjacent to the forward ends of the arms for engaging a brake lining mounted on a brake shoe, a block having a pair of relatively spaced lugs on its forward face and a pair of forwardly projecting shoulders opposed to and spaced laterally of the lugs and of a line connecting the lugs, the block being adapted to engage the end of a brake shoe with the lugs spanning the rib of the shoe and the shoulders and lugs engaging respectively the end and beneath the rim of the shoe, whereby to locate and hold the block in fixed abutting position against said end of the shoe, and power means cooperating with the arms and the block for drawing the brake lining longitudinally toward said end of the shoe.

ARTHUR L. CORNWELL.